Nov. 11, 1958        P. D. HURWITZ        2,859,759
FLOW PROPORTIONING AND CONTROL SYSTEM
Filed Oct. 13, 1955        2 Sheets-Sheet 1
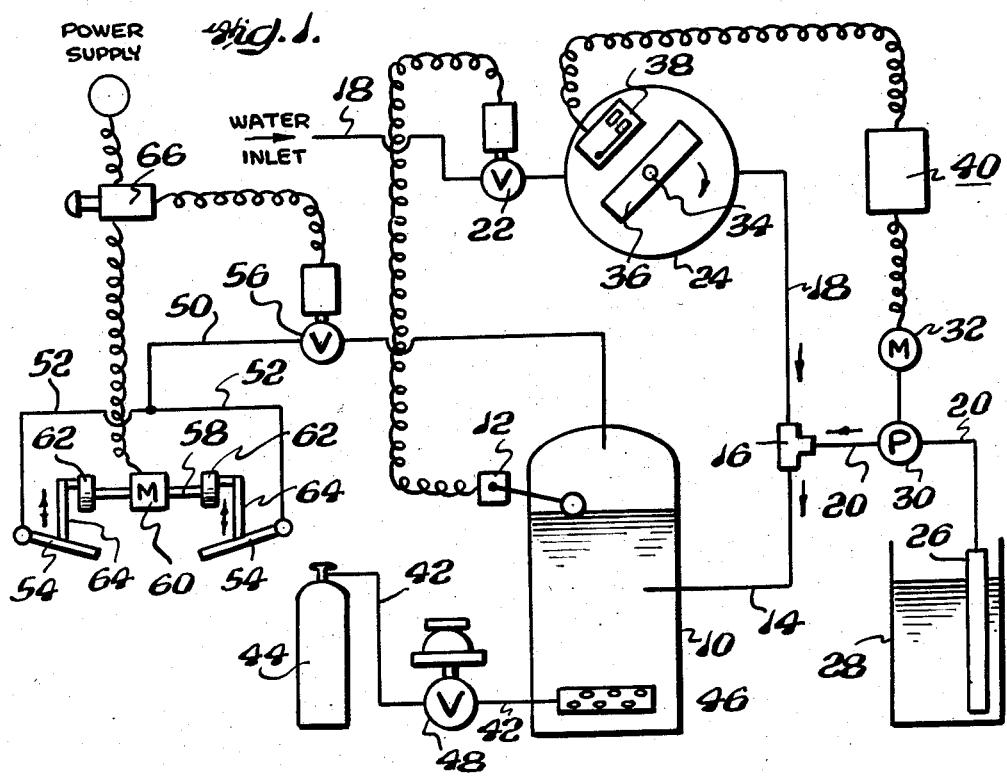
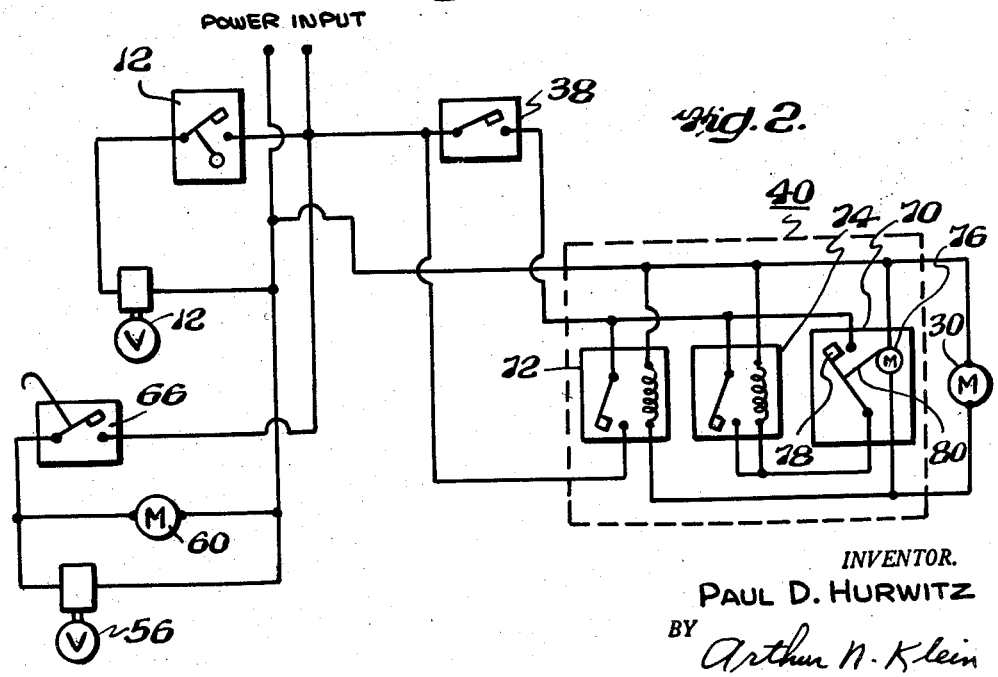
INVENTOR.
PAUL D. HURWITZ
BY Arthur N. Klein
ATTORNEY

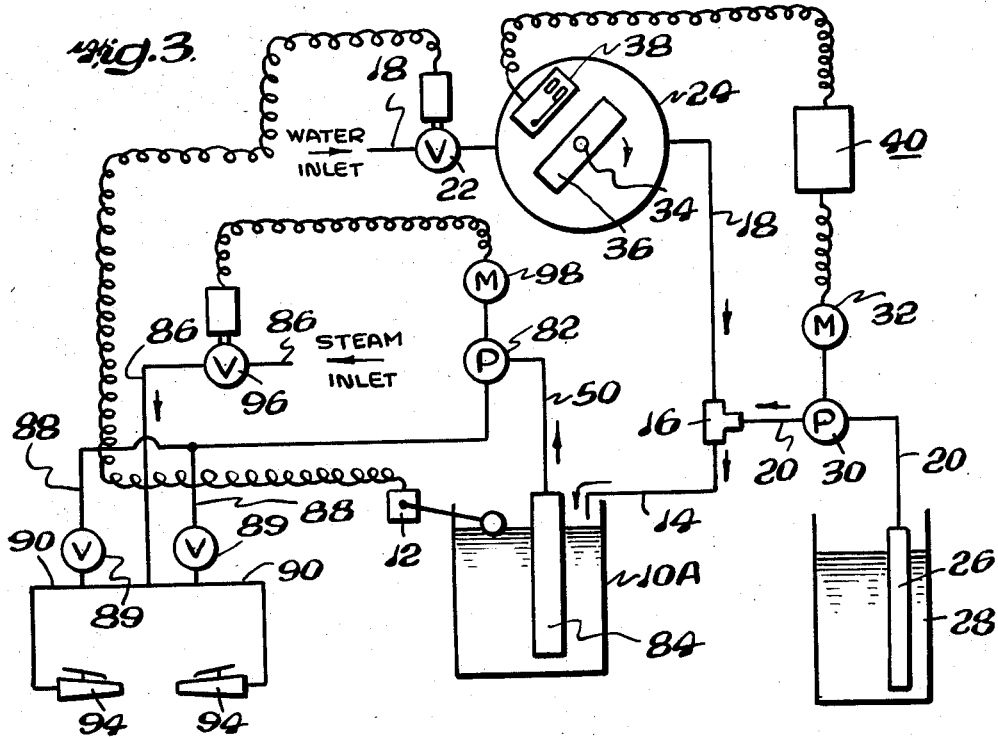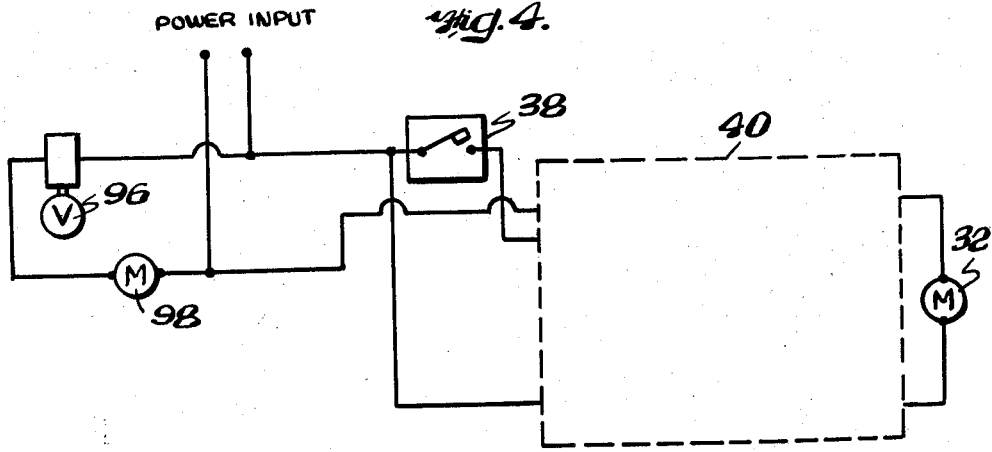

2,859,759

FLOW PROPORTIONING AND CONTROL SYSTEM

Paul D. Hurwitz, Havertown, Pa.

Application October 13, 1955, Serial No. 540,263

3 Claims. (Cl. 137—83)

The present invention relates generally to fluid flow systems and more particularly to systems for mixing and delivery of a plurality of different fluids in predetermined proportions.

An object of the present invention is to provide a new and useful system for mixing and delivering two or more different fluids in predetermined proportions. Another object of the present invention is to provide a novel system for mixing detergent with another fluid, as for example water or steam, in predetermined proportions; and for thereafter delivering the detergent-water or detergent-steam mixture to an object requiring cleaning, for instance, an automobile moving on a conveyor line as is common in so-called "quick wash" arrangements.

Other objects and advantages of the present invention are apparent in the following detailed description, appended claims and accompanying drawings.

For the purpose of illustrating the invention, forms thereof, which are presently preferred, and which have been found in practice to give satisfactory results, are shown in the drawings. It is to be understood, however, that this invention is not limited to the precise arrangements and instrumentalities shown, and that the various parts and elements can be differently arranged and organized without departing from the spirit of this invention.

Referring to the accompanying drawings, in which like reference characters indicate like parts throughout:

Figure 1 is a diagrammatic flow sheet of a system embodying the present invention, and intended for mixing liquid detergent with water, in predetermined proportions, and delivering the mixture, in the form of an aerated foam, to a car-wash station.

Figure 2 is a schematic wiring diagram of the system of Fig. 1.

Figure 3 is a diagrammatic flow sheet, similar to that of Fig. 1, but showing a system for mixing liquid detergent with steam.

Figure 4 is a fragmentary schematic wiring diagram showing how the diagram of Fig. 2 is modified for the embodiment of Fig. 3.

Referring to the system of Fig. 1, I may provide a closed foam tank 10, having a level control float switch 12 located slightly below the top of the tank. An inlet line 14 communicates with the tank 10 at about the center point of its vertical dimension. A T 16 connects the other end of the inlet line 14 with a water delivery line 18 and a detergent delivery line 20. The water delivery line 18 is provided with a solenoid valve 22 and a meter 24 for measuring the volume of water passing through the line 18 to the inlet line 14. The detergent delivery line 20 is provided with a riser pipe 26 immersed in a detergent concentrate storage tank 28, and is also provided with a pump 30 for transferring the liquid detergent concentrate from the tank 28 to the inlet line 14. The pump may be driven by a motor 32, through a variable speed pulley arrangement (not shown) in conventional manner.

The meter 24 may be a conventional water meter, as for example that manufactured by the Buffalo Meter Company, having a rotor mounted within a chamber so that it rotates as the water flows through the chamber, the extent of rotation being an indication of the volume of flow. Water meters having rotors for measuring the volume of flow are well known in the art, and are shown, for example in Patents 1,049,288 and 1,147,219 and, accordingly, it is deemed unnecessary to show the rotor mechanism herein; it being understood that the shaft 34 is rotated by the rotor mechanism to a degree proportional to the volume of water flow through the meter.

Mounted on the free end of the shaft 34 is a switch-actuating arm 36, which is disposed diametrically of the shaft. A micro-switch 38 is mounted in operative juxtaposition to the arm 38, so that the normally open micro-switch is closed whenever either end of the arm 36 comes into contact with it. In other words, the micro-switch is closed at every half-revolution of the shaft 34, although, of course, by cutting off one end of the arm 36, this could be changed to provide one closing for each full revolution.

The micro-switch 38 is operatively connected to the pump motor 32 so that the motor is started each time the micro-switch closes and is stopped each time the micro-switch opens. It can be seen that, since the turning of the switch-actuating arm 36 depends on the rate of flow of water through the line 18, the pump 30 will run intermittently during flow of water to deliver detergent to the inlet line 14 (it being mixed with the water at the T 16), so that a more or less constant ratio of detergent and water is delivered to the tank 10. In order to change the ratio of detergent and water, it is necessary merely to change the rate at which the pump operates (as for example by changing the setting of the variable speed pulley) so that greater or lesser amounts of detergent are delivered for a given amount of water.

Operatively electrically connected between the micro-switch 38 and the pump motor 32 is a unit 40 which may be called an intervalometer, and which ensures against excessive or insufficient running of the pump motor. The construction and operation of the intervalometer will be described hereinbelow.

An air inlet line 42 leads from a compressed air tank 44 to a perforated diffuser sleeve 46 set horizontally into the tank 10 slightly above the bottom of the tank. A reducing valve 48 is operatively connected within the air inlet line 42 and functions to reduce the high pressure (within the tank or reservoir 44) to a lower air pressure of about 5 pounds at the diffuser sleeve 46. In place of the tank 44, it is possible to employ a conventional air compressor.

Air entering the closed tank 10 through the sleeve 46 bubbles upward through the detergent solution generating a foam or suds above the water level. A foam delivery line 50 leads from the top of tank 50 and connects with two lines 52 leading to separate pivotally mounted foam dispensing nozzles which are spaced apart and designed to spray detergent foam onto opposite sides of an automobile (not shown) positioned therebetween. The line 50 is provided with a solenoid valve 56.

The foam dispensing nozzles 54 are provided with actuating mechanism comprising a shaft 58 constructed and arranged to be rotated by a motor 60 and having a pair of disk cranks 62 mounted at its ends. A pair of crank arms 64 are pivotally connected to the cranks 62 in off-center relationship thereto and extend downward from the cranks. The lower ends of the crank arms are connected to the nozzles 54, so as to cause them to reciprocate, in a generally vertical plane, when the shaft 58 is rotated by the motor 60.

A normally open trip switch 66 is so positioned that it is contacted and closed by an automobile moving into position between the nozzles 54, so as to open the normally closed solenoid valve 56 in the foam delivery line 50, and also to start the motor 60, beginning reciprocation of the foam dispensing nozzles 50.

When the valve 56 is opened, as described above, the air pressure within the tank 10 forces the foam or suds, through the delivery line 50 and the lines 52, to the nozzles, from which it is ejected onto the automobile body as the nozzles reciprocate. The nozzle reciprocation and foam ejection continue as the car moves gradually along between the nozzles so as to cover the entire car surface with detergent foam, as part of the washing operation. When the rear end of the car passes beyond the trip switch 66, the latter closes, so as to cut off further delivery of foam and also to stop reciprocation of the nozzles.

It is apparent that only a small amount of detergent and water are used up in generating a relatively large volume of detergent foam and it has been found that great savings in material cost are effected, as compared to the conventional method of dipping a brush into a detergent solution and applying it by hand, to say nothing of savings made possible by eliminating manual labor.

It can be seen that continued generation of foam gradually lowers the level of water-detergent mixture within the tank 10. When this level drops below the predetermined value, as measured by the float switch 12, the float switch operates to open the normally closed solenoid valve 22 in the water delivery line 18, and starts water, from the city mains, flowing through the line 18 and the inlet line 14, into the tank 10. This flow of water actuates the meter 24 to cause rotation of the shaft 34 and the arm 36, which, in turn, causes periodic closing of the micro-switch 38 and starting of the detergent pump motor 32, so that, at intervals, measured amounts of detergent concentrate are pumped from the storage tank 28, through the line 20, to be mixed with the water entering the inlet line 14.

By way of illustration, the rate of flow of water and detergent can be set so that about 3 gallons of water is delivered with each complete revolution of the meter shaft 34. During this complete revolution, the micro-switch 38 is twice closed (for about 5 seconds each time) by the opposite ends of the switch-actuating arm 36. Each time the switch is closed, it starts the pump motor 32 to deliver about 1½ ounces of detergent concentrate to the inlet line, thereby maintaining a ratio of about 3 ounces of detergent concentrate to about 3 gallons of water. Obviously, the ratio of detergent concentrate to water can be varied through wide limits, depending on various factors, such as the nature and strength of the original detergent concentrate, the strength desired for the final mixture, etc.

However, it is theoretically possible for the micro-switch 38 to be locked in closed position when the liquid level in the tank 10 rises sufficiently to open the float switch 12 and to shut off the flow of water through the line 18, in which case, detergent would continue to flow alone into the tank 10, unless suitable over-riding mechanism were provided to stop the pump motor 30 at the appropriate time. Likewise, it is theoretically possible for the micro-switch 38 to open before the pump motor 32 has run long enough (for example 5 seconds) to deliver sufficient detergent to the inlet line 14, as is required to maintain the desired detergent-water ratio, unless, once again, suitable over-riding mechanism is provided to keep the pump motor running for the desired period of time even though the micro-switch 38 has opened prematurely.

This over-riding mechanism is provided by the electrical control means or intervalometer 40, as shown in the schematic wiring diagram of Fig. 2.

The intervalometer 40 includes a timer 70 a relay 72 and a second relay 74. The intervalometer functions as follows.

Closing of the micro-switch 38 energizes relay 72 through the normally closed contacts of relay 74 and thereby locks relay 72 in. Once relay 72 is locked in, its coil continues to receive power (through a circuit which includes the closed contacts of relay 72 and the closed contacts of relay 74), even if the micro-switch 38 should open prematurely.

At the same time that relay 72 is locked in, as described above, the clock motor 76 of the timer 70 starts running, as does also the concentrate pump motor 32. At the end of the timing cycle (for example 5 seconds), the relay switch 78 of the timer 70 is closed by the mechanical connection 80 with the motor 76.

Closing of relay switch 78, as aforesaid, energizes the coil of relay 74, which in turn opens the normally closed contacts of relay 74. This de-energizes the coil of relay 72 causing the normally open contacts to open, which results in relay 72 opening and dropping out. Dropping out of relay 72 de-energizes pump motor 32, and also de-energizes clock motor 76; thereby enabling the clock motor, which is spring-loaded to starting position, to re-cycle immediately, so as to be ready for the next timing operation.

From the foregoing description, it is apparent that the detergent pump motor 32 will run for the predetermined period of time (for example 5 seconds) even if the micro-switch 38 should open beforehand.

Should the micro-switch 38 be held in closed position (by reason of the fact that the switch-actuating arm 36 happens to stop in switch-contacting position), after the timer motor 76 has completed its timing cycle, relay 74 locks itself in electrically, power coming from the lines connected by the normally open, but now closed, contacts of said relay 74, and energizing the coil of relay 74. As long as relay 74 is thus locked in, the line to the detergent pump motor 32 is broken and the pump cannot run. After the micro-switch 38 is again opened (through re-starting of rotation of the water meter shaft 34), the line to the coil of relay 74 is broken and the relay drops out; the contacts returning to normally closed (left in Fig. 2) position, which sets up the intervalometer for the next cycle.

Fig. 3 shows a diagrammatic flow sheet, generally like that of Fig. 1, but covering a somewhat modified form of this invention wherein liquid detergent concentrate is mixed with steam; the mixture being used, for example, in scrubbing automobile wheels and tires preliminary to the application of detergent foam to the automobile body, as described hereinabove.

The system of Fig. 3 for the most part resembles that of Fig. 1, and the parts which are the same, having already been described, will not again be explained in detail.

The tank 10-A, instead of being a closed pressure tank, may now be an open tank since, as will be explained, its contents are removed by a positive displacement pump located in the delivery line 50. The inlet line 14 is introduced into the top of the open tank 10-A. The air inlet line 42 and diffuser sleeve 46 are omitted.

As mentioned above, the delivery line 50 from the tank 10-A is provided with a positive displacement pump 82. The line 50 is also provided with a riser pipe 84 extending down into the tank 10-A, whereby the pump 82 sucks liquid up from adjacent the bottom of the tank and sends it through the line 50.

A steam line 86 branches off into two lines 90, each terminating at a nozzle 92 provided with a manually operated on-off valve 94; the nozzles 94 being located on opposite sides of the automobile to be cleaned.

The detergent delivery line 50 branches off into two lines 88 which connect with the lines 90, whereby a steam-detergent mixture is delivered to the nozzles 94, enabling two attendants to work simultaneously in cleaning the left and right wheels respectively, by directing the steam-detergent mixture thereon. The lines 88 may be provided with flow regulating valves 89 to regulate the rate of delivery of detergent therethrough.

Mounted within the steam line 88 is a control element 96 which is sensitive to flow of steam therethrough and which operates, whenever steam starts to flow (upon opening of either or both of the nozzles 92), so as to start the driving motor 98 for the pump 82, whereby detergent concentrate is pumped (from the tank 10-A) through the line 50, to mix with the steam, at the T 86, in predetermined ratio. The flow-responsive electrical control element 96 is of conventional construction, manufactured, for example by Magnetrol, Inc., Chicago, Illinois, and no need is seen to elaborate upon its construction or operation herein.

Any suitable means, as for example a variable-speed pulley arrangement (not shown), can be provided intermediate the pump motor 98 and its pump 82, so that the volume of liquid delivered by the pump 82 can be changed so as to alter the proportion of detergent-to-steam as desired.

A mixture of detergent and water is delivered to the tank 10-A through the inlet line 14 in the same manner as described above in connection with the embodiment of Figs. 1 and 2. That is, water comes from the line 18 and detergent concentrate comes through the line 20 from the storage tank 28; the two mixing at the T 16. The detergent concentrate pump 30 is controlled from the micro-switch 38 on the water meter 24, through the overriding action of the intervalometer 40 in the same manner as described hereinabove.

The schematic wiring diagram for the embodiment of Fig. 3 is the same as that shown in Fig. 2, except that, as indicated in Fig. 4, the trip switch 66, solenoid valve 56 and motor 60 are eliminated and replaced by the control element 96 and pump motor 98.

In employing a steam-detergent mixture, it may be desirable to start with a stronger detergent solution in the tank 10-A than is used in the embodiment of Fig. 1.

The present invention may be embodied in other specific forms and, therefore, the above-described embodiments are to be considered in all respects as illustrative and not restrictive; reference being made to the appended claims as indicating the scope of this invention.

Having thus described my invention, I claim as new and desire to protect by Letters Patent the following:

1. A fluid flow proportioning system including a fluid line provided with an on-off valve, switch means for periodically opening and closing said valve, a metering device operatively connected within said line and having a rotating member constructed and arranged to turn responsive to the volume of flow of fluid through said line, a second fluid line leading to the first line and connected therewith at a point beyond the metering device, a pump operatively connected within the second line and constructed and arranged to force fluid therethrough, an electric driving motor operatively connected to said pump, a normally open switch operatively connected to said pump motor, said switch being constructed and arranged to be periodically mechanically closed by the rotating member whereby the motor and pump run intermittently, and electrical control means operatively connected between the switch and the pump motor to insure predetermined running time for said motor and pump regardless of premature or delayed opening of said switch, said electrical control means including a timer having an electric timing motor which is spring-loaded so as mechanically to recycle when deenergized, said timer also having a normally open switch mechanically connected to the timing motor so as to be closed at the end of the preset timing cycle, said electrical control means also including a normally open relay and a second relay having a double throw switch adapted to be moved from a normally closed contact position to another closed contact position when said second relay is energized; closing of the pump motor switch serving to start the timing motor and also locking in the first relay through the normally closed contacts of the second relay, locking in of the first relay closing a circuit to the timing motor which is independent of the pump motor switch, closing of the timer switch at the end of the timing cycle operating to lock in the second relay so as to shift the switch of said second relay to its other closed contact position, thereby causing the first relay to drop out so as to de-energize both the pump motor and the timing motor, locking in of the second relay keeping the line to the pump motor open until the pump motor switch is mechanically re-opened.

2. A system according to claim 1 wherein water flows through the first fluid line and concentrated liquid detergent is pumped through the second line, and wherein the detergent-water mixture flows into a reservoir tank, said tank having a float-level switch electrically connected to the on-off valve in the first line whereby the valve is opened when the liquid level in the tank drops and the valve is closed when the liquid level in the tank rises.

3. A system according to claim 2 wherein the reservoir tank is a closed tank, and wherein a compressed air line leads to the bottom of the tank whereby air bubbles up through the detergent-water mixture to form a detergent foam in the upper portion of the tank, and wherein an outlet line leads from the top of the tank whereby air pressure forces the detergent foam out of the tank and through the outlet line.

References Cited in the file of this patent

UNITED STATES PATENTS

| | | |
|---|---|---|
| 1,820,316 | Miller | Aug. 25, 1931 |
| 2,077,257 | Ofeldt | Apr. 13, 1937 |
| 2,098,893 | Staegemann | Nov. 9, 1937 |
| 2,302,923 | Zunarik | Nov. 24, 1942 |
| 2,356,950 | Root | Aug. 29, 1944 |
| 2,610,643 | Goff | Sept. 16, 1952 |